April 20, 1954 — E. KRISTENSEN — 2,675,624
MICROMETER HEIGHT GAUGE
Filed June 12, 1953

INVENTOR.
Einer Kristensen
BY
Samuel Ullman
Atty

Patented Apr. 20, 1954

2,675,624

UNITED STATES PATENT OFFICE 2,675,624

MICROMETER HEIGHT GAUGE

Einer Kristensen, Detroit, Mich.

Application June 12, 1953, Serial No. 361,121

4 Claims. (Cl. 33—170)

1

The present invention pertains to a novel micrometer height gage. The principal object of the invention is to provide such a gage that is more accurate and reliable than those now in use.

It is recognized that existing height gages are not absolutely reliable and that different readings on the same job will be obtained even by skilled mechanics. The difficulty is inherent in the construction of present gages.

The present invention overcomes this difficulty by providing a more stable support for the sensitive parts of the gage. Further, the invention provides a scribing tool that constantly follows the gaging point. This tool also makes possible an accurate initial setting of the gaging point, without which an accurate reading is impossible.

The invention is fully disclosed by way of example in the following description and in the accompanying drawings in which.

Reference to these views will now obtain by use of like characters which are employed to designate corresponding parts throughout.

Figures 1, 2, 3:
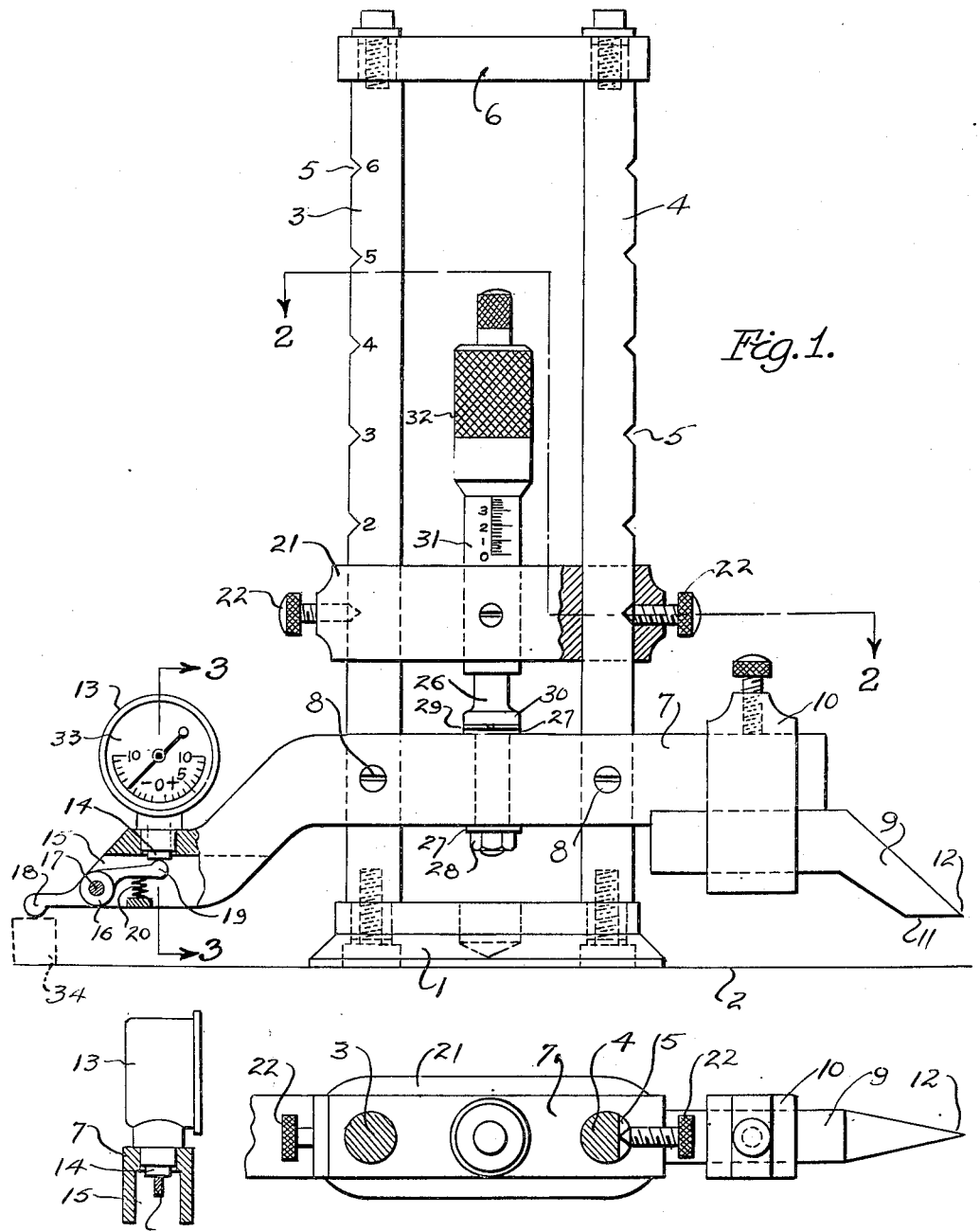
Figure 1 is a side elevation of the device.
Figure 2 is a section on the line 2—2 of Figure 1.
Figure 3 is a section on the line 3—3 of Figure 1.

In Figure 1 is shown a base 1 adapted to rest on a suitable surface such as the surface plate 2. On the base are mounted two vertical posts 3 and 4, notched at 5 at regular intervals such as one inch apart. The upper ends of the posts are preferably joined and braced by a top bar 6.

A scribing or carrier bar 7 is slidably mounted on the posts and extends in both directions from the posts. After being adjusted as will be described, the bar 7 may be secured to the posts by set screws 8. At one of the projecting ends the bar is secured to a scribing tool 9 by means of a suitable clamp 10. The tool 9 has a lower flat surface 11 adapted to engage the plate 2 in the manner described and is also formed with a scribing point or edge 12.

At the other projecting end at the bar 7 is mounted a conventional dial indicator 13, with its finger 14 inserted in the bar. The finger is exposed at the top of a slot 15 in the bar, and in this slot a lever 16 is pivotally mounted between its ends at 17. One end 18 of the lever is exposed outside the bar, and the other end 19 bears upwardly against the finger 14 under the action of a spring 20.

A micrometer screw bar 21 is slidably mounted on the posts 3 and 4 and is supported in a selected pair of opposed notches 5 by pointed set screws

2

22 at each end. When it is desired to shift the bar 21 on the rods, the screws 22 are drawn out of the notches, and then inserted in the new position.

A conventional micrometer has a screw spindle 26 secured to the bar 21, passing therethrough and secured in the bar 7. The attachment of the spindle to the bar 7 is made by thrust bearings 27 at the top and bottom of the bar 7, with a nut 28 holding the lower bearing. Over the upper bearing is a spring washer 29 held against a shoulder 30 on the spindle 26. The bar 7 is clamped between the bearings by tightening the nut 28. The usual micrometer screw barrel 31 is mounted on the bar 21, and over the barrel is the thimble 32. These parts are graduated in the usual manner as shown.

In the use of the device, the sliding bars 7 and 21 are first trued by setting the micrometer at zero and bringing the bars down so that the surface 11 and the lever end 18 engage the plate 2. When the bars are raised, the spring 20 introduces a small reading on the indicator dial 33, showing that the indicator is active.

The piece 34 to be measured in height is now placed on the plate 2 and directly below the end 18. The sliding structure has been raised to the nearest inch above the work piece, as indicated by the markings on the post 3. The micrometer bar 21 remains locked in the corresponding notches 5 by means of the split screws 22 and 23, as described.

The micrometer is now adjusted until its screw 26 brings the sliding structure downward and the end 18 in contact with the top of the work piece. A slight excess downward movement is applied to neutralize the small reading on the indicator and effect a zero reading, so that the operator knows that the work piece is actually engaged by the end 18. This position is then secured by the set screws 8. The actual height is the difference between the notch reading and the micrometer reading.

The scribing point 12 is at the same height at the end 18. This height may be marked on a template laid edgewise on the surface plate 2 and moved against the point 12.

It is well known in shop practice that the present micrometer height gages are not absolutely precise. This condition is due to a leverage action on the arm that carries or operates the indicator. No two mechanics will obtain the same reading, and it requires an especially skilled mechanic to take a reasonably approximate reading.

The sliding bar structure of this invention, having points on attachment on two vertical posts, overcomes these difficulties. An accurate reading is obtained with reasonable care, even though the operator is not especially skilled.

The device may be checked initially and from time to time with Johansson gage blocks. The adjustments for taking measurements are not determined by the pressure exerted by the micrometer screw or calculated movement of the indicator, but rather by the actual movement of the bar 7 by the micrometer screw. The small initial error introduced by the spring 20 is neutralized when the work piece or gage block is contacted by the lever end 18, and serves to show that the indicator is active.

Although a specific embodiment of the invention has been illustrated and described, it will be understood that various operations in the details of construction may be made without departing from the scope of the invention, as indicated by the attendant claims.

What I claim is:

1. A micrometer height gage comprising a base, a pair of posts thereon, a scribing bar slidable on said posts and having an aperture at one end, means for securing said bar to each of said posts; a scribing tool carried by said bar, an indicator carried by said bar at a distance from said tool, said indicator having a finger entering said aperture, a lever pivoted intermediate its ends to said bar and having one end engaging said finger, the other end of said lever lying at the level of said tool, a spring holding the first end against said finger, a micrometer screw bar slidable on said posts, above the first bar, a micrometer having a barrel mounted on said screw bar, a thimble on said barrel, and a screw spindle in said barrel, said spindle having a threaded relation to one of said bars and a non-sliding relation to the other bar, said posts having graduated stations for supporting said screw bar.

2. A micrometer height gage as set forth in claim 1, wherein said stations consist of opposed graduated notches, said screw bar having releasable means adapted to engage in opposed notches.

3. A micrometer height gage as set forth in claim 1, wherein the first bar extends laterally beyond the respective posts and said tool and lever are mounted on different ends of the first bar.

4. A micrometer height gage as set forth in claim 1, wherein the first bar extends laterally beyond the respective posts and said tool and lever are mounted on different ends of the first bar said stations consisting of opposed graduated notches, said screw bar having releasable means adapted to engage in opposed notches.

References Cited in the file of this patent

UNITED STATES PATENTS

| Number | Name | Date |
|---|---|---|
| 2,242,151 | Sisson | May 13, 1941 |
| 2,515,719 | Lemburg | July 18, 1950 |
| 2,588,131 | Lester | Mar. 4, 1952 |